United States Patent [19]
Rothwell et al.

[11] 3,941,428
[45] Mar. 2, 1976

[54] AIR BRAKE WHEEL LOCK CONTROL VALVE MECHANISM

[75] Inventors: Jack L. Rothwell, Flint; Williams S. Warren, Flushing, both of Mich.

[73] Assignee: General Motors Corporation, Detroit, Mich.

[22] Filed: May 8, 1975

[21] Appl. No.: 575,657

[52] U.S. Cl. ............... 303/21 F; 137/627.5; 303/40
[51] Int. Cl.² ....................... B60T 8/06; B60T 15/12
[58] Field of Search ....................... 303/21 F, 61–63, 303/68–69, 40, 6 R, 7; 118/181 A; 137/627.5

[56] References Cited
UNITED STATES PATENTS

| | | | |
|---|---|---|---|
| 3,620,577 | 11/1971 | Neisch et al. | 303/21 F |
| 3,823,987 | 7/1974 | Kurichh | 303/21 F |
| 3,854,501 | 12/1974 | Machek | 303/21 F X |
| 3,857,614 | 12/1974 | Kurichh | 303/21 F |
| 3,862,782 | 1/1975 | Horowitz | 303/40 |
| 3,881,779 | 5/1975 | Machek | 303/21 F |

*Primary Examiner*—Trygve M. Blix
*Assistant Examiner*—Douglas C. Butler
*Attorney, Agent, or Firm*—D. D. McGraw

[57] ABSTRACT

An air brake system having a brake application valve controlling a relay valve by pilot pressure. A wheel lock control portion includes a valve for venting a relay valve pilot chamber upon actuation of a solenoid valve during antiskid operation of the system. A supply pressure restrictor mechanism, held inactive during normal conditions, operates upon closure of the solenoid valve to restrict the supply of pressure from the pressure source to the relay valve supply port in order to permit a slower brake re-application rate upon skid control termination. The pressure restrictor mechanism is returned to its normally inoperative state upon release of the brake application valve.

2 Claims, 4 Drawing Figures

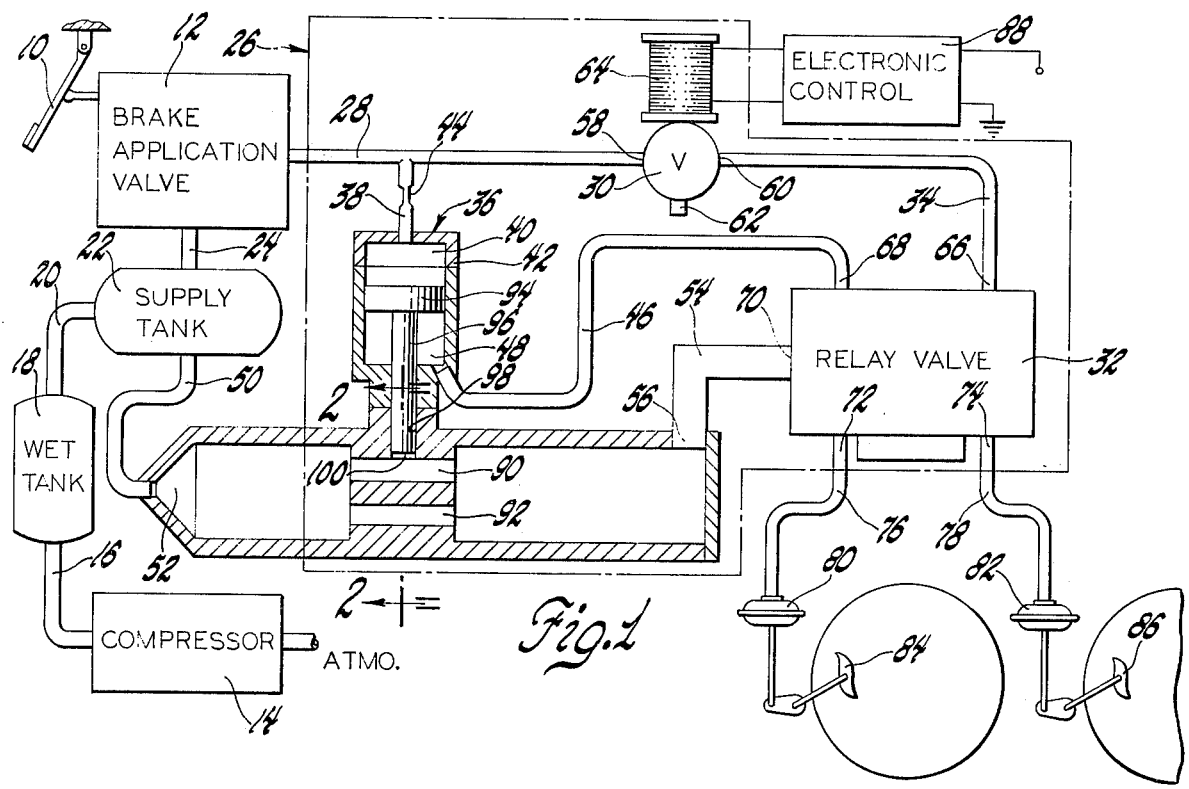
Fig.1
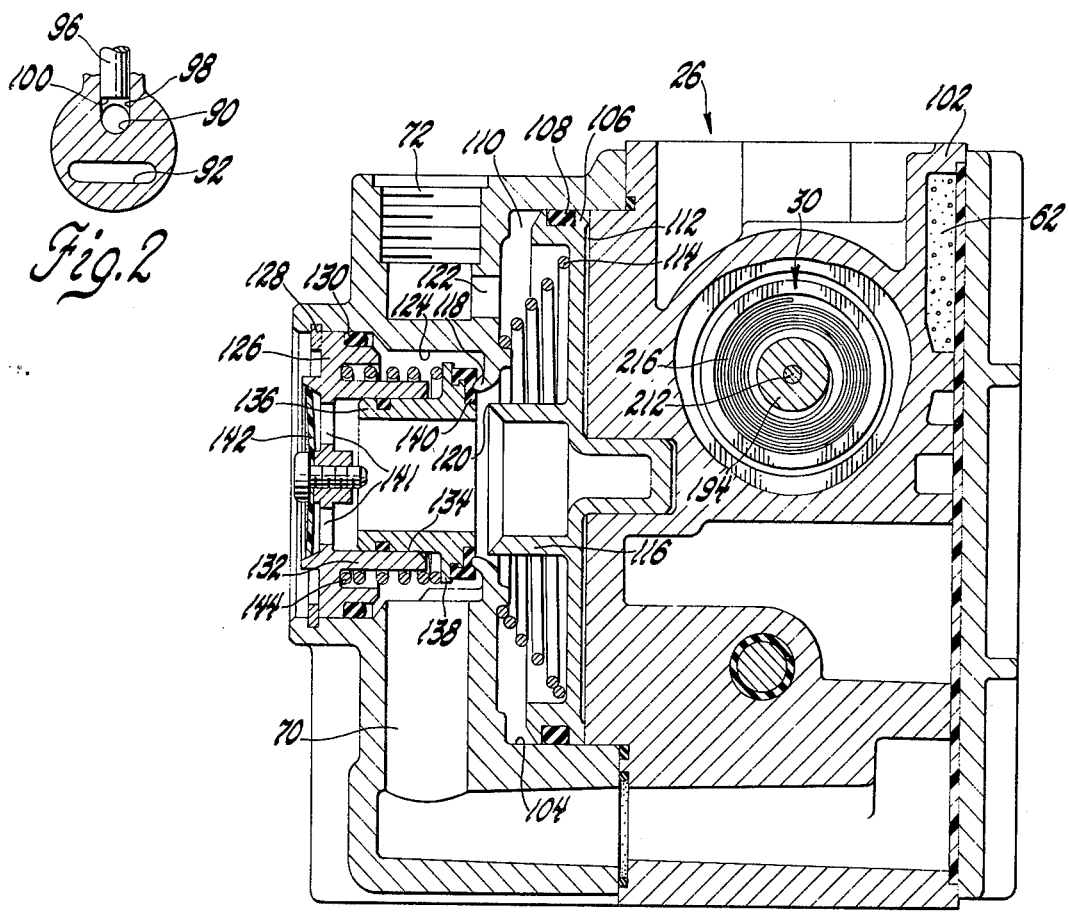
Fig.2
Fig.3

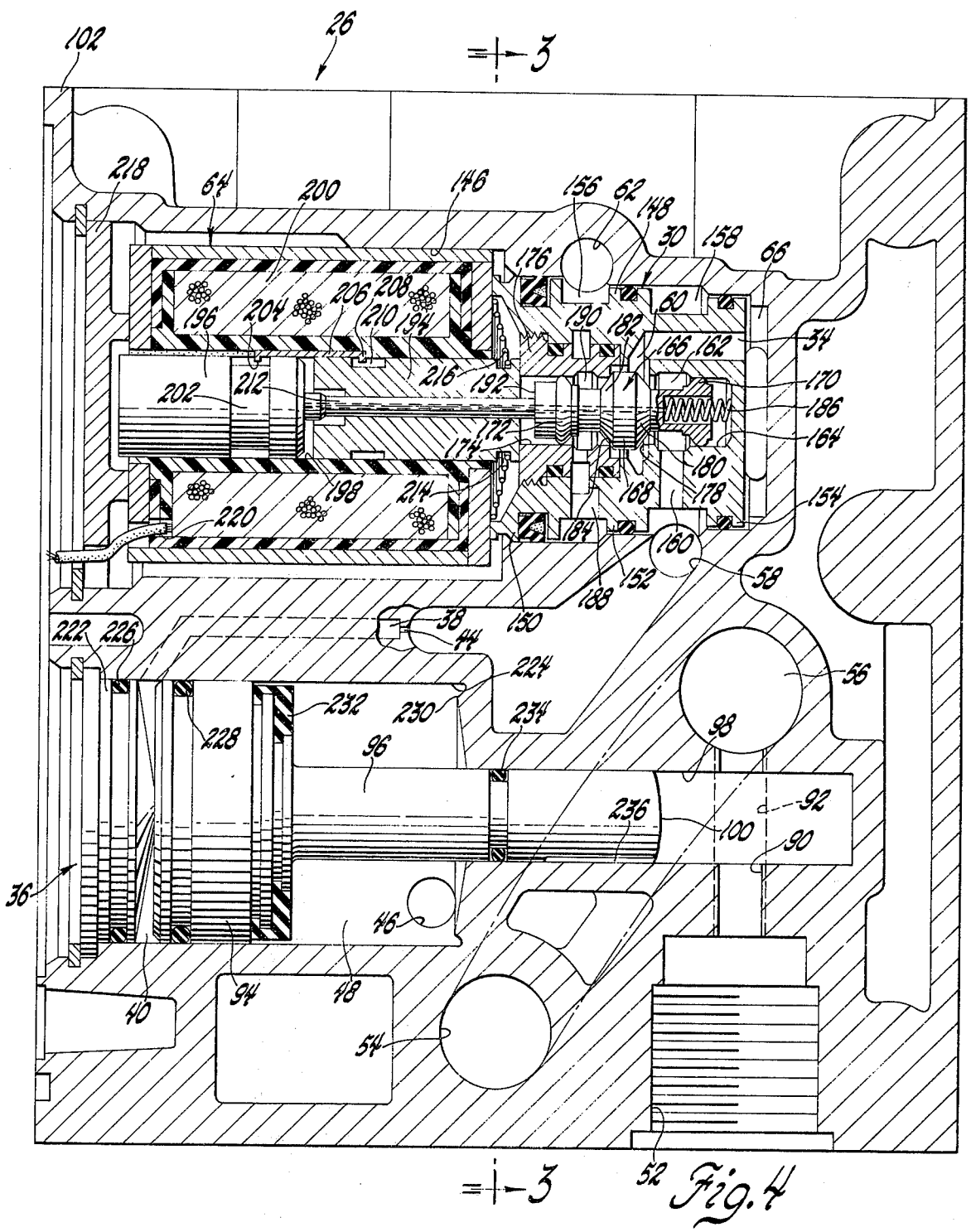

AIR BRAKE WHEEL LOCK CONTROL VALVE MECHANISM

The invention relates to an air operated and controlled brake system of the type used in trucks. It is a feature of the invention that normal brake application and release when no wheel lock is eminent occurs in accordance with a pilot pressure acting upon a relay valve to control a supply pressure for operating the wheel brakes, while the rate at which the operating pressure can be provided during wheel lock control operation is set at a lesser rate through a restrictor mechanism controlled by the pilot pressure through a restriction and by release of the pilot pressure in the relay valve upon release of brake operating pressure due to activation of a wheel lock control system. When the system is operating normally, the vehicle operator applies and releases the brake by controlling a brake application valve which generates pilot pressures from the supply pressure. The pilot pressures in turn control the action of a relay valve, which admits the necessary amount of operating pressure to the vehicle brake actuating chambers to actuate the brakes, and releases the operating pressure from the brake actuating chambers when the brakes are to be released.

The invention is embodied in a mechanism which selectively controls the application of pilot and supply pressures to the relay valve independently of the vehicle operator's demand for brake operating pressure so long as the operator holds the brake application valve in a position tending to actuate the brake system. A solenoid operated, normally open wheel lock control valve is inserted in the pilot pressure line between the brake application valve and the relay valve and acts upon receipt of a wheel lock control signal from a logic control to close off pilot pressure to the relay valve and to vent to atmosphere that portion of the relay valve normally receiving pilot pressure, causing the brakes to be released. When the logic control signals that incipient wheel lock no longer exists, the valve is opened to readmit pilot pressure to the relay valve in a controlled manner. The system will continue to cycle in this manner until there is no longer a requirement for wheel lock control activation. A supply pressure restrictor is actuated by pilot pressure. The restrictor includes an actuating piston having one side exposed to pilot pressure from the brake application valve through a restriction so that the build-up of pilot pressure acting on the actuating piston takes place at a slower rate than would occur if no restriction were provided. The other side of the actuating piston has a lesser effective area than the first noted side and is connected in a less restrictive manner to receive the same pilot pressure, if any, that is provided to the relay valve. Therefore in normal brake operation the pilot pressure on the smaller piston area will build up at a faster rate than the pilot pressure on the larger piston area. This, in combination with the application of supply pressure to a plunger connected to the actuating piston will hold the actuating piston in the inactive position so that no restriction occurs to the supply pressure furnished the relay valve during normal operation. When the wheel lock control valve has been actuated, the pilot pressure furnished to the actuating piston through the restrictor continues to exert a force on the actuating piston, while the pilot pressure acting on the other side of the actuating piston is vented to atmosphere. This causes activation of the actuating piston, moving the plunger so that a supply pressure thereafter furnished the relay valve can increase only at a predetermined lesser rate than before. This condition is maintained until the brake application valve is released and the entire pilot pressure conduit, including the section with the restrictor in it leading to the actuating piston, is reduced to atmospheric pressure. Pressures acting on the piston and plunger will move the actuating piston back to the inactive position.

In the drawings:

FIG. 1 is a simplified schematic representation of a truck air brake system having portions of the system broken away and in section.

FIG. 2 is a cross section view of a portion of a supply restrictor mechanism illustrated schematically in FIG. 1, with parts broken away.

FIG. 3 is a cross section view of a valve assembly including the relay valve, the wheel lock control valve, and the supply pressure restrictor mechanism, with parts broken away and in section.

FIG. 4 is a cross section view of the valve assembly of FIG. 3 with arrows 3—3 showing where the section view of FIG. 3 is taken.

The schematic illustration of FIG. 1 shows portions of a truck air brake system with emphasis on the invention. The brake system includes a brake pedal 10 connected to operate a brake application valve 12. Air pressure is supplied for the system by a compressor 14 connected through conduit 16, wet tank 18 and conduit 20 to the supply tank 22. Conduit 24 connects the supply tank with the brake application valve 12.

Portions of the system which are illustrated in mechanical detail in FIGS. 3 and 4 as an assembly 26 are outlined by a dot-dash line in FIG. 1. The truck brake system has a pilot pressure line 28 connecting the brake application valve 12 to the assembly 26. Line 28 continues as various passages in assembly 26 and is schematically illustrated in FIG. 1 as a conduit leading to the normally open valve 30. The connection between valve 30 and the relay valve 32 is illustrated in FIG. 1 as a conduit 34. The supply pressure restrictor mechanism 36 is illustrated in FIG. 1 as being connected by a branch 38 to line 28. Branch 38 leads to a chamber 40 in housing 42 through a fixed restriction 44. FIG. 1 also illustrates a conduit 46 leading from the relay valve 32 to chamber 48 of housing 42. A conduit 50 connects with the inlet 52 of the supply pressure restrictor mechanism 36 and a conduit 54 connects the outlet 56 of mechanism 36 with the relay valve 32.

The normally open valve 30 has a pilot pressure inlet 58, a pilot pressure outlet 60, and an atmospheric vent 62. A valve operating solenoid 64 is normally deenergized so that valve 30 provides a connection between inlet 58 and outlet 60 while closing vent 62. When the solenoid 64 is energized, valve 30 is actuated to close inlet 58 and connect outlet 60 with vent 62.

The relay valve 32 has a pilot pressure inlet 66 to which conduit 34 is connected, a pilot pressure outlet 68 to which conduit 46 is connected, and a supply pressure inlet 70 to which conduit 54 is connected. The valve is illustrated as having delivery outlets 72 and 74 which are respectively connected to conduits 76 and 78. These conduits are in turn respectively connected to brake actuating chambers 80 and 82, which respectively actuate wheel brakes 84 and 86.

The system of FIG. 1 is also schematically illustrated as having an electronic control 88 which is part of a wheel lock control system. As is well known in the art, suitable sensors (not shown) are provided to sense wheel deceleration and acceleration, and the electronic control acts as a logic control to generate signals which selectively energize and deenergize solenoid 64 in accordance with the braking requirements of the wheel lock control logic.

The supply pressure restrictor mechanism 36 is schematically illustrated as being contained in housing 42 with two parallel passages 90 and 92 connecting the inlet 52 and the outlet 56. In normal brake operating conditions wherein the wheel lock control system is not active the full supply pressure provided at inlet 52 passes through passages 90 and 92 to outlet 56 with substantially no restriction. It will be recognized however that if passage 90, for example, is closed, there will be a restriction to the transmission of supply pressure so that a build-up in brake operating pressure in brake actuating chambers 80 and 82 under control of the relay valve 32 can occur only at a slower rate than if there were no such restriction. The restrictor mechanism accomplishes this upon actuation of the wheel lock control system. The restrictor mechanism includes a piston 94 reciprocably mounted in housing 42 so that chamber 40 is on one side thereof and chamber 48 is on the other side. A plunger 96 extends through chamber 48 and a bore 98 in housing 42, with the end 100 of the plunger being exposed to supply pressure in passage 90. The plunger is so positioned that when it moves downwardly as seen in FIG. 1 it will substantially close off passage 90. The effective area of piston 94 exposed to chamber 40 is greater than the effective area of the piston exposed to chamber 48 due to the area of plunger 96 which is not exposed to chamber 48. As will be further described below, the generation of pilot pressure in line 28 will cause a build-up of pressure in chamber 40 through restriction 44. However, in normal brake operation pilot pressure also passes substantially without restriction into chamber 48 through valve 30, conduit 34, relay valve 32, and conduit 46. Therefore pressure builds up at a faster rate during brake application in chamber 48 than in chamber 40, and this pressure together with supply pressure acting on the plunger end 100, keeps the piston and plunger in the inactive position shown in FIG. 1. When the wheel lock control actuates valve 30, pilot pressure continues to be exerted in chamber 40, urging piston 94 downwardly. However chamber 48 is vented to atmosphere because valve 30 vents conduit 34 to atmosphere through vent 62. The pressure in chamber 40 acting over a larger effective area of piston 94 overcomes the force exerted by the supply pressure acting on plunger end 100, moving the piston and plunger downwardly to substantially close passage 90. The piston and plunger are held in this position until pressure is released in chamber 40 by release of the brake application valve 12 so that pilot pressure in line 28 is vented to atmosphere. In this condition pressures acting on piston 94 and plunger end 100 will move the piston 94 and plunger 96 upwardly to again open passage 90 as explained below in greater detail.

The assembly 26 shown in FIGS. 3 and 4 includes the normally open wheel lock control valve 30, the relay valve 32, the restrictor mechanism 36, and various passages and conduits connecting them. The relay valve is shown in FIG. 3, together with some connections to other portions of the assembly. The normally open solenoid operated valve and the restrictor mechanism are shown in FIG. 4. The housing 102 has the supply inlet 52 therein, to which conduit 50 is connected leading to parallel passages 90 and 92. Passage 90 is intersected by bore 98. Passages 90 and 92 connect with outlet 56, which is in turn connected with inlet 70 of the relay valve through passage 54. Passage 54 is schematically illustrated in FIG. 1 as a conduit. The relay valve includes a cylinder 104 having a piston 106 reciprocably mounted therein with a seal 108 on the outer periphery of the piston and dividing cylinder 104 into chambers 110 and 112. A spring 114, located in chamber 110, urges piston 106 in a direction tending to increase the volume of chamber 110 while decreasing the volume of chamber 112. A centrally disposed annular wall 116, formed as a part of piston 106, opens radially within and inwardly spaced from an annular valve seat 118 located on a part of the housing wall defining chamber 110. Another valve seat 120 is located on the end of wall 116. A passage 122 maintains continuous fluid connection between chamber 110 and a delivery port 72. Delivery port 74 is also similarly connected with chamber 110, but is not seen in the cross section views. A stepped bore 124 is positioned coaxially with annular seat 118 and is larger in diameter than the seat. An exhaust valve body 126 is retained in position in the open end of bore 124 by snap ring 128 and has a seal 130 adjacent its outer periphery to provide a seal between the exhaust valve body 126 and bore 124. A cylindrical wall section 132 of exhaust valve body 126 extends toward seat 118 and has a bore 134 receiving an annular modulation tube 136 in reciprocal and sealing relation. A radially extending flange 138 on one end of tube 136 provides a mount for a seal-like valve 140. This valve is axially aligned so as to be engageable in sealing relation with valve seats 118 and 120. When piston 106 is in the position illustrated, in which the brakes are released, seat 120 is axially spaced from valve 140 and the valve is in sealing engagement with seat 118. The inner portion of tube 136 is connected to atmosphere through restrictive atmospheric vents 141. These vents are covered by a dust seal 142 which provides substantially no restriction to air flow outwardly through vents 62. A spring 144 fits about cylindrical wall section 132 with one end acting on the exhaust valve body and the other end acting on the modulation tube flange 138 so that valve 140 is continually urged toward valve seats 118 and 120. Chamber 112 is connected with the relay inlet port 66 and outlet port 68 so that pilot pressure delivered to the relay valve through conduit 34 is received in chamber 112.

The solenoid assembly 64 and the normally open valve 30 are best illustrated in FIG. 4. They are positioned in a stepped bore 146. The inner end of the bore provides the inlet 66 which receives pilot pressure from the valve through the passage 34. This passage is schematically illustrated as a conduit in FIG. 1. The valve 30 is formed as a cartridge assembly and includes a retainer or housing 148 fitted in the portion of bore 146 adjacent inlet 66. The retainer 148 is generally annular and has three spaced lands 150, 152, 154 on its outer periphery. The groove between lands 150 and 152 forms a chamber 156, and the groove between lands 152 and 154 forms another chamber 158. Chamber 156 is connected with the atmospheric vent 62, illustrated in FIG. 4 as a port. Vent 62 opens through an air filter as better seen in FIG. 3. Chamber 158 is connected with the valve inlet port 58, which in turn is connected with the pilot pressure line 28 as schematically illustrated in FIG. 1. The pilot pressure line branch 38 is formed in part by a cored chamber and in part by an internal passage which leads to chamber 40. The fixed restriction 44 is provided in branch 38. Chamber 158 is connected through a flow passage 160 formed in retainer 148 to a chamber 162. This chamber is an enlarged portion of a bore 164 in which a spool valve 166 is reciprocably mounted. The valve is provided with a large center land 168, a somewhat smaller land 170 extending into the closed end of bore 164 so that chamber 162 is between lands 168 and 170, and another smaller end land 172 which is reciprocably received in a bore 174 formed in a valve retainer 176. This retainer is annular and is threaded into an enlarged portion of bore 164 so that its bore 174 is axially aligned with the portion of bore 164 receiving land 170. A valve seat 178 is formed by a portion of the wall of bore 164 adjacent chamber 162 and engageable with the beveled side 180 of land 168. The other beveled side 182 of land 168 is similarly engageable with another valve seat 184 formed at the end of retainer bore 174. Valve 166 is axially recessed near land 170 to receive compression spring 186 so that the spring continually urges land beveled side 182 toward seat 184. This is the release or open position illustrated in FIG. 4. It can be seen that inlet port 58 is connected with outlet 60 through flow passage 160, chamber 162, and the open valve section 178 and 180. Similarly, the atmospheric vent 62, connected through chamber 156 and a flow passage 188 to a chamber 190 in bore 174 and between lands 168 and 172, is closed off relative to inlet port 58 and outlet 60 by the seating of land side 182 on seat 184. The end of valve 166 in bore 174 has a face 192 positioned adjacent the solenoid pole piece 194 of the solenoid assembly 64. The solenoid assembly has an armature 196 reciprocably mounted in the bore 198 of the coil assembly 200. Armature 196 has a groove 202 extending circumferentially about a portion so that an inwardly turned end 204 of a clip 206 mounted in bore 198 limits the amount of axial movement of the armature. The clip extends axially so that another inwardly turned clip end 208 fits within a similar groove 210 formed in pole piece 194 to similarly limit axial movement of the pole piece. A bore extends through pole piece 194 and armature extension 212 passes therethrough, with the end thereof engaging face 192 of valve 166. Groove 214, formed about the end of pole piece 194 adjacent the valve retainer 176, receives one end of a spring 216 so that the spring urges pole piece 194 into abutting end engagement with retainer 176. The solenoid assembly has a retainer 218 secured in the open end of bore 146 to hold the assembly in place. The electrical wires 220 are connected to the coil assembly 200 through an aperture provided in retainer 218. These wires connect the solenoid coil assembly to the electronic control 88, as schematically illustrated in FIG. 1.

The supply pressure restrictor mechanism 36 is also illustrated in FIG. 4. A retainer 222, secured in the open end of bore 224 in which piston 94 is reciprocably mounted, closes one end of chamber 40. Suitable seals 226 and 228 are provided to seal retainer 222 and piston 94 relative to the wall of bore 224. The bottom of bore 224 has an annular seat 230 formed thereon and engageable with the piston face seal 232. Port 46 so opens into chamber 48 that when seal 232 engages seat 230, the port remains in communication with chamber 48. The plunger 96 has a seal 234 on it so that it is sealed relative to bore 98.

The assembly 26 is shown in FIGS. 3 and 4 in the brake released position, with the brake application valve released and generating no pilot pressure, and normal supply pressure available. When the vehicle operator actuates the brake pedal 10 to cause the brake application valve 12 to generate pilot pressure in line 28, the pressure is transmitted in a substantially unrestricted manner through inlet 58, flow passage 160, past valve elements 178 and 180, through outlet 60 and passage 34, to inlet 66 of the relay valve. This inlet is connected to chamber 112 so that the pilot pressure acts on piston 106 in opposition to spring 114. Atmospheric pressure exists in chamber 110 since valve 140 and valve seat 118 are closed, preventing supply pressure from inlet 52, passages 90 and 92, passages 54 and 56, and relay valve inlet 70, from being transmitted further. The pilot pressure acting in chamber 112 moves piston 106 leftwardly, causing seat 120 to engage valve 140 and therefore close off chamber 110 from atmosphere. This is a poised position of the relay valve wherein valve 140 is seated on both seats 118 and 120. Further movement of piston 106 causes the modulation tube 136 to move leftwardly as seen in FIG. 3 against the force of spring 144, lifting valve 140 from seat 118 and controllably admitting supply pressure from inlet 70 into chamber 110 and then out through delivery ports 72 and 74 to the brake actuating chambers 80 and 82. Thus the brakes are actuated by an operating pressure generated from the supply pressure in an amount controlled by the amount of pilot pressure exerted on piston 112 and at an apply rate of increase permitted by the supply pressure and the operation of valve 140 relative to valve seat 118. The valve will return to its poised position when the operating pressure acting on piston 106 balances the pilot pressure acting thereon. It is noted that the pilot pressure acts over a greater area than the operating pressure and spring 114 is a light spring. Therefore the pilot pressure is somewhat less than the operating pressure when the poised position is attained. When the operator decides to release the brakes, the brake application valve reduces the pilot pressure to atmospheric pressure, and the operating pressure in chamber 110 moves piston 106 rightwardly, with modulation tube 136 following it until valve 140 seats against seat 118. Further rightward movement of piston 106 opens seat 120 relative to valve 140, connecting chamber 110 with atmosphere through controlled exhaust vents 141. The brake actuating chambers therefore vent their operating pressures to atmosphere at a rate controlled by the amount of restriction caused by vents 141.

When the brakes are initially applied as above noted, pilot pressure is also transmitted through branch 38 and restriction 44 to chamber 40 of the restrictor mechanism. However, chamber 48 is relatively unrestrictedly connected by port or passage 46 to inlet 66 so that the pilot pressure builds up more quickly in chamber 48 than in chamber 40. Also, supply pressure acts on the end 100 of plunger 96 to further urge piston 94 to stay in the inactive position shown in FIG. 4.

When the wheel lock control system senses an incipient wheel lock condition, the logic control causes the coil assembly 200 of the solenoid assembly 64 to be energized. This causes armature 196 to move rightwardly, moving valve 166 by means of armature extension 212 rightwardly against the force of spring 186 to open the valve formed by land side 182 and seat 184, and close the valve formed by seat 178 and land side 180. This closes communication between inlet 58 and outlet 60 of the normally open valve, and connects the outlet 60 with the atmospheric vent 62. Therefore chamber 112 of the relay valve is vented to atmosphere and the relay valve immediately operates to vent the brake actuating chambers 80 and 82 to atmosphere through vents 141. This allows the wheels to begin accelerating rather than decelerating, removing the eminent wheel lock condition. The venting of relay valve inlet 66 to atmosphere also vents chamber 48 to atmosphere through port 46, which is connected to inlet 66. This removes some of the pressure supporting piston 94 in the inactive position and the remaining pressure acting only on plunger end 100 is insufficient to keep the pilot pressure in chamber 40 from moving piston 94. The piston and plunger 96 therefore move rightwardly as seen in FIG. 4 so that the portion of the plunger between seal 234 and plunger end 100 closes off passage 90. Later reactivation of the brake by release of the wheel lock control operation, with the brake application valve having been maintained in its brake applying position so that pilot pressure is maintained in chamber 40, will not move piston 94 back to the inactive position since the pilot pressure now acts on an even smaller effective area of piston 94 as defined by seat 230 in its engaged position with seal 232, and there is insufficient force to move the piston in the leftward direction. When the vehicle operator releases the brake application valve so that no pilot pressure is generated and the pilot pressure in line 28 returns to atmospheric pressure, the pressure in chambers 40 and 48 return to atmosphere. The supply pressure at inlet 52 acts on the plunger end 100, either by slowly leaking past the plunger into the bottom of bore 98, or by a small relief passage 236. This pressure will act to move piston 94 and plunger 96 to the inactive position.

So long as the brake application valve is generating pilot pressure the wheel lock control system will cycle the brakes in accordance with signals generated by the logic control until wheel lock is no longer incipient. This condition may be reached by virtue of the truck having stopped, the tire-to-road surface adhesion having increased, the operator having partially released the brakes, or a combination of these circumstances.

What is claimed is:

1. In an air brake system for an automotive vehicle, said system having
   a source of supply air pressure;
   a brake application valve receiving air pressure from said source and operable to generate pilot brake apply pressures from the supply air pressure;
   a normally open solenoid closed valve having an inlet and an outlet normally in communication with each other, and an atmospheric vent adapted to be connected with said outlet with said inlet closed when the solenoid is energized to close said valve, said inlet receiving pilot brake apply pressure from said brake application valve;
   wheel lock control means for energizing the solenoid while incipient wheel lock is present at a wheel being braked;
   a relay valve connected with said normally open valve outlet for receiving the pilot brake apply pressures passing through said normally open valve and generating corresponding brake apply pressures from the supply air pressure, said relay valve having a supply air inlet connected with said source and a delivery outlet connected with a wheel brake actuator;
   and a supply air restrictor for selectively restricting air flow from said source of supply air pressure to said relay valve supply air inlet;
   the improvement comprising:
   a continuously open restrictive flow conduit receiving pilot brake apply pressures from said brake application valve and a relatively less restrictive flow conduit connected fluidly intermediate said normally open valve outlet and said relay valve;
   said supply air restrictor including a power wall and plunger having one power wall side connected to said restrictive flow conduit and the other, lesser effective area, power wall side connected to said relatively less restrictive flow conduit and a plunger end exposed to supply air pressure;
   whereby when said normally open valve is open and the brake system is actuated to apply the brake, pressure builds up at a slower rate on said power wall one side than on said power wall other side to hold said restrictor inactive, and when said normally open valve is closed to connect said normally open valve outlet to atmosphere and so vent said power wall other side to atmosphere, said restrictor is activated and thereafter held activated until pressure on said power wall one side is vented to atmosphere by release of the brake application valve.

2. In an air brake system for an automotive vehicle, said system having
   a source of supply air pressure;
   a brake application valve receiving air pressure from said source and operable to generate pilot brake apply pressure from the supply air pressure;
   a normally open solenoid closed valve having an inlet and an outlet normally in communication with each other, and an atmospheric vent adapted to be connected with said outlet with said inlet closed when the solenoid is energized to close said valve, said inlet receiving pilot brake apply pressures from said brake application valve;
   wheel lock control means for energizing the solenoid while incipient wheel lock is present at a wheel being braked;
   a relay valve connected with said normally open valve outlet for receiving the pilot brake apply pressure passing through said normally open valve and generating corresponding brake apply pressures from the supply air pressure, said relay valve having a supply air inlet connected with said source, a delivery outlet connected with a wheel brake actuator, and an exhaust outlet selectively connected in fluid communication with said delivery outlet to release brake actuating pressure from the wheel brake actuator;
   and a supply air restrictor for selectively restricting air flow from said source of supply air pressure to said relay valve supply air inlet;
   the improvement comprising:
   a continuously open restrictive flow conduit receiving pilot brake apply pressure from said brake application valve and a relatively less restrictive flow conduit connected fluidly intermediate said normally open valve outlet and said relay valve;
   said supply air restrictor including a power wall and plunger having one power wall side connected to said restrictive flow conduit with a predetermined effective area exposed to air pressure delivered thereto through said restrictive flow conduit and the other power wall side having a lesser predetermined effective area with said other power wall side connected to said relatively less restrictive flow conduit and a plunger end exposed to supply air pressure;

whereby when said normally open valve is open and the brake system is actuated to apply the brake, pressure builds up at a slower rate on said power wall one side than on said power wall other side to hold said restrictor inactive, and, when said normally open valve is closed to connect said normally open valve outlet to atmosphere and so vent said power wall other side to atmosphere, said restrictor is activated and thereafter held activated until pressure on said power wall one side is vented to atmosphere by release of the brake application valve, said relay valve exhaust outlet acting as a flow restriction to release of brake actuating pressure from the wheel brake actuator, when said relay valve delivery outlet is disconnected from said relay valve supply air inlet and connected with said relay valve exhaust outlet, to establish a predetermined maximum brake release rate.

* * * * *

UNITED STATES PATENT AND TRADEMARK OFFICE
CERTIFICATE OF CORRECTION

PATENT NO. : 3,941,428
DATED : March 2, 1976
INVENTOR(S) : Jack L. Rothwell, William S. Warren It is certified that error appears in the above-identified patent and that said Letters Patent are hereby corrected as shown below:

Title page, column 1, the second inventor's first name should be changed from "Williams" to William.

Signed and Sealed this twenty-second Day of June 1976

[SEAL]

Attest:

RUTH C. MASON
*Attesting Officer*

C. MARSHALL DANN
*Commissioner of Patents and Trademarks*